US010885163B2

(12) United States Patent
Huang et al.

(10) Patent No.: US 10,885,163 B2
(45) Date of Patent: Jan. 5, 2021

(54) AUTHENTICATION WITHOUT INPUTTING PASSWORDS

(71) Applicant: INTERNATIONAL BUSINESS MACHINES CORPORATION, Armonk, NY (US)

(72) Inventors: He Huang, Beijing (CN); Shi Peng Li, Beijing (CN); Jin Hong Fu, Beijing (CN); Shi Chong Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 16/039,737

(22) Filed: Jul. 19, 2018

(65) Prior Publication Data

US 2020/0026827 A1    Jan. 23, 2020

(51) Int. Cl.
*G06F 21/31*  (2013.01)
*H04L 9/32*   (2006.01)
*G06F 21/60*  (2013.01)

(52) U.S. Cl.
CPC .......... *G06F 21/31* (2013.01); *G06F 21/604* (2013.01); *H04L 9/3271* (2013.01); *G06F 2221/2103* (2013.01)

(58) Field of Classification Search
CPC .. H04M 1/66; G09B 7/02; G09B 5/00; G09B 7/00; G06F 21/31; G06F 21/604; G06F 7/04; H04L 9/3271; H04L 9/32
See application file for complete search history.

(56) References Cited

U.S. PATENT DOCUMENTS

| | | | |
|---|---|---|---|
| 5,559,961 A | 9/1996 | Blonder | |
| 8,621,209 B1* | 12/2013 | Johansson | H04L 63/08 713/155 |
| 8,818,334 B2* | 8/2014 | Hoh | H04L 63/105 455/41.1 |
| 8,881,266 B2 | 11/2014 | Chow et al. | |
| 8,955,058 B2 | 2/2015 | Castro et al. | |
| 9,264,423 B2 | 2/2016 | Cox | |
| 2007/0101010 A1 | 5/2007 | Ellison et al. | |
| 2009/0276839 A1 | 11/2009 | Peneder | |
| 2010/0240018 A1* | 9/2010 | Bethune | G09B 7/02 434/309 |
| 2013/0149688 A1* | 6/2013 | Bean | G09B 5/00 434/362 |

(Continued)

OTHER PUBLICATIONS

Hidaka et al., "Poster: Input Password Only with Arrow Keys", SOUPS 2013, pp. 1-4.

(Continued)

*Primary Examiner* — Thanhnga B Truong
(74) *Attorney, Agent, or Firm* — L. Jeffrey Kelly (57) ABSTRACT

The present disclosure provides a computer-implemented method, computer system and computer program product for user authentication. According to the method, identity information can be received from a user, and a plurality of questions can be presented to the user, the plurality of questions comprising one or more valid questions generated based on a password related to the identity information and one or more invalid questions. Then, an input can be received from the user, and in response to the input corresponding to the one or more valid questions, the user can be authenticated based on the input.

19 Claims, 6 Drawing Sheets

(56) References Cited

U.S. PATENT DOCUMENTS

2014/0137203 A1    5/2014   Castro et al.
2015/0172273 A1    6/2015   Dong et al.
2017/0177881 A1    6/2017   Krishna et al.

OTHER PUBLICATIONS

Mell et al., "The NIST Definition of Cloud Computing", National Institute of Standards and Technology, Special Publication 800-145, Sep. 2011, pp. 1-7.

* cited by examiner

| Position | 1 | 2 | 3 | 4 | 5 | 6 | 7 | 8 | 9 |
|---|---|---|---|---|---|---|---|---|---|
| Position verified? | N | N | N | N | N | N | N | N | N |
| Category | Alphabet | Digit | Symbol | Digit | Symbol | Alphabet | Alphabet | Digit | Digit |
| Category verified? | N | N | N | N | N | N | N | N | N |
| Value | a | 9 | & | 0 | # | s | p | 3 | 2 |
| Value verified? | N | N | N | N | N | N | N | N | N |

AUTHENTICATION WITHOUT INPUTTING PASSWORDS

BACKGROUND

The present invention relates to an authentication mechanism, and more specifically, to authentication without inputting passwords.

Conventionally, a user can input a username and a password to login to a system. However, there is a risk of password disclosure during the process of inputting the password. For example, malware or insecure equipment may be installed on a device used by the user, and keystrokes or other user actions on the device may be traced by a hacker. Besides, the password may be peeped by other people or by a hidden camera nearby. Therefore, there is an increasing need for a secure authentication mechanism.

SUMMARY

According to one embodiment of the present invention, there is provided a computer-implemented method for user authentication. According to the method, identity information can be received from a user, and a plurality of questions can be presented to the user, the plurality of questions comprising one or more valid questions generated based on a password related to the identity information and one or more invalid questions. Then, an input can be received from the user, and in response to the input corresponding to the one or more valid questions, the user can be authenticated based on the input.

According to another embodiment of the present invention, there is provided a computer system for user authentication. The computer system comprises a processor, a computer-readable memory coupled to the processor. The computer-readable memory comprises instructions that when executed by the processor perform actions of: receiving identity information from a user; presenting a plurality of questions to the user, the plurality of questions comprising one or more valid questions generated based on a password related to the identity information and one or more invalid questions; receiving an input from the user; and in response to the input corresponding to the one or more valid questions, authenticating the user based on the input.

According to another embodiment of the present invention, there is provided a computer program product for user authentication. The computer program product comprises a computer readable storage medium having program instructions embodied therewith, the program instructions executable by a processor to cause the processor perform actions of: receiving identity information from a user; presenting a plurality of questions to the user, the plurality of questions comprising one or more valid questions generated based on a password related to the identity information and one or more invalid questions; receiving an input from the user; and in response to the input corresponding to the one or more valid questions, authenticating the user based on the input.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
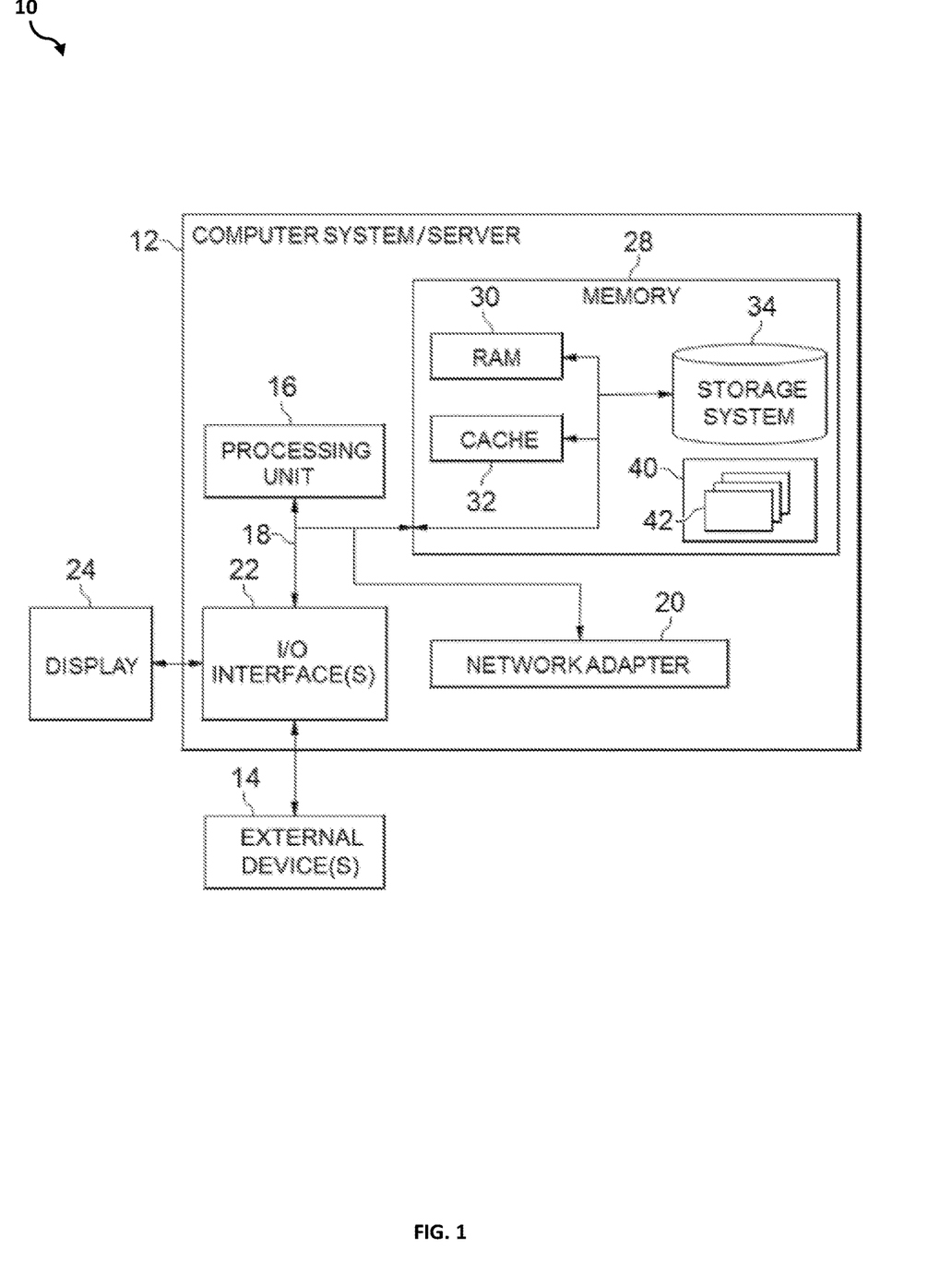
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
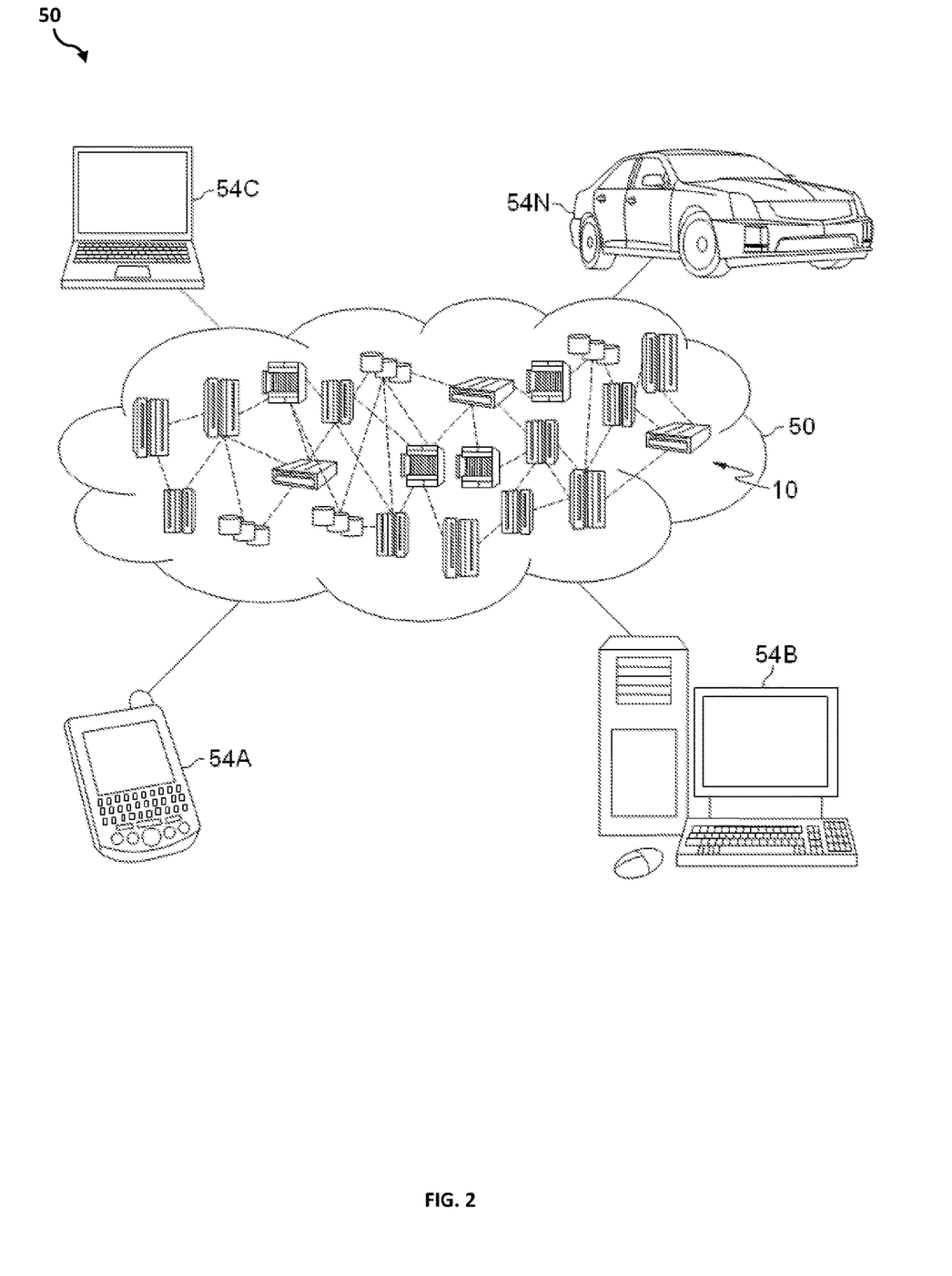
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
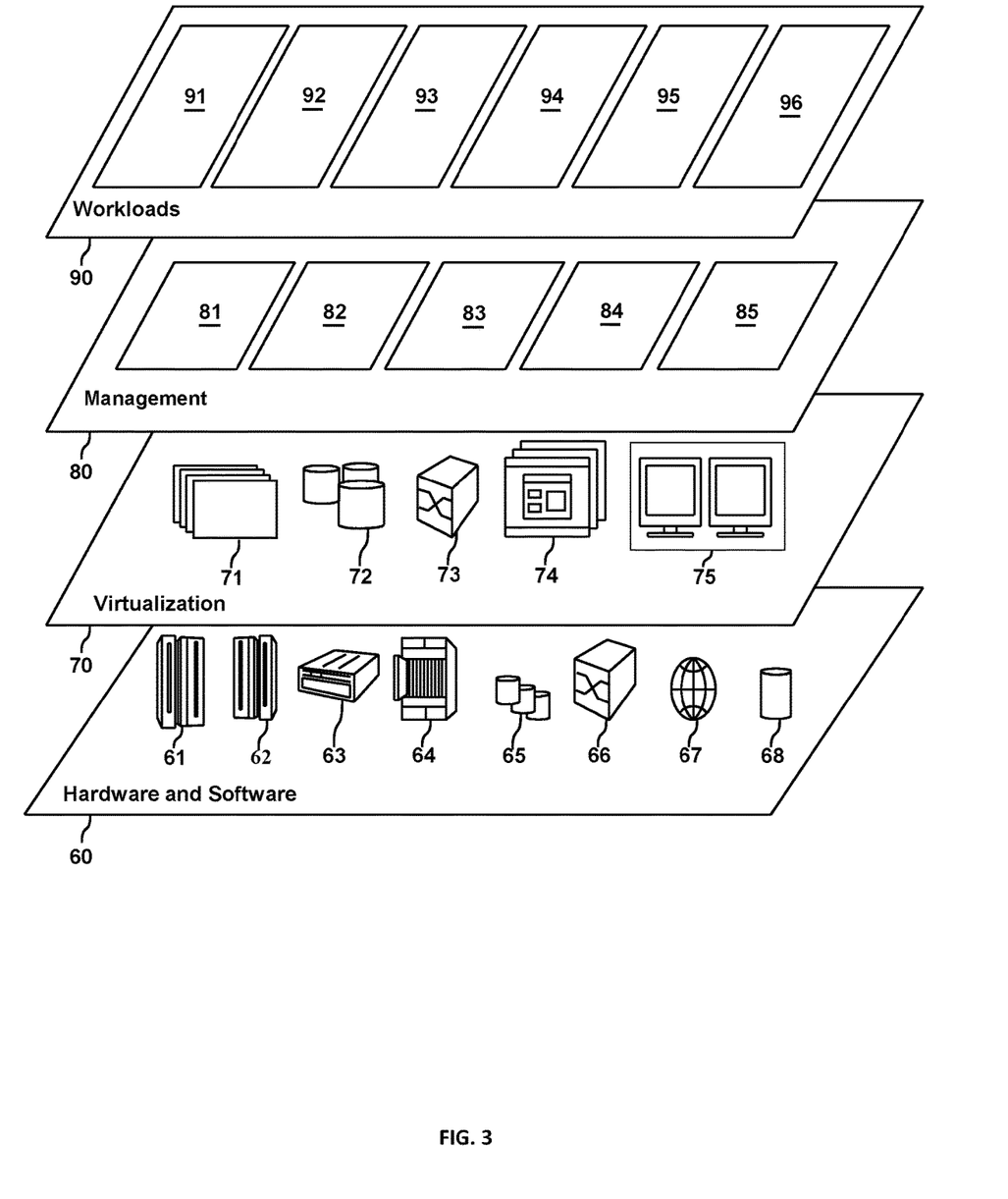
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication mechanism 96.

Nowadays, many systems authenticate users through usernames and passwords. Users may have to input a username and a password to access an application or a service. There may be a risk of password disclosure if a user has to directly input the password (e.g., user directly typing the password on a computer keyboard).

Embodiments of the present invention provide an authentication mechanism, in which a user may not be required to directly input a password when the user needs to access applications or services.

A user may set identity information and a related password in a system or a server and use the identity information and the password to access an application or a service in the future. As an example, the identity information can include a username, a user number or any information suitable to identify a user. The accessed application or service can be an application or service running on a local device, an operation system running on the local device or an application or service running on a remote server.

The identity information and the password can be associated with each other. The identity information and the password set by the user can be saved on a local device, a remote device, a server, a database, or any other suitable device. It shall be understood that the identity information and the password can be saved as plain texts and/or cipher texts. The password may include one or more characters, such as digits, letters or symbols. In a further example, the password may also include icons, figures, audio clips or video clips.

Figure 4:
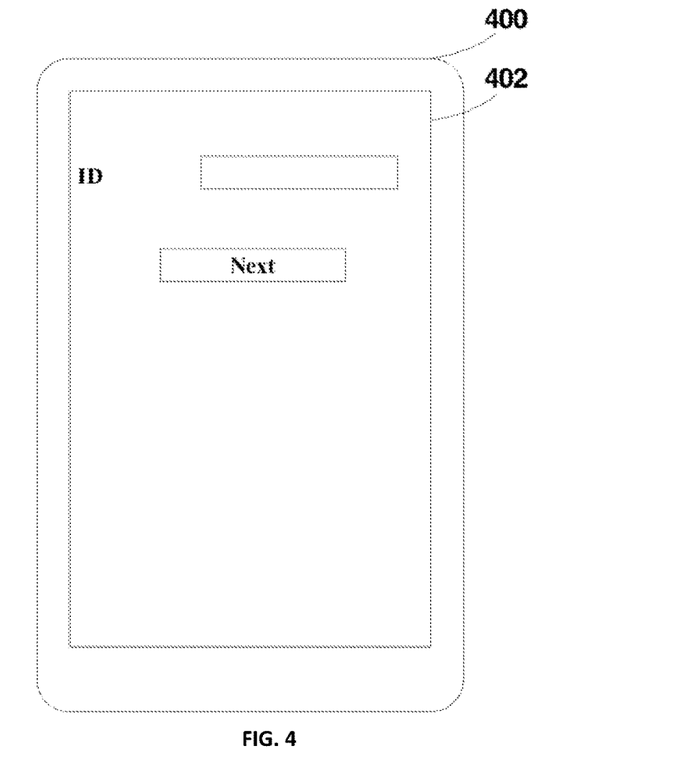
FIG. 4 depicts an example device according to an embodiment of the present invention.

With reference now to FIG. 4, an example device 400 for user authentication is illustrated according to an embodiment of the present invention. Device 400 includes a displaying module 402, which can be used to display contents to the user. Device 400 also includes an input module, for example a touch screen, which can be used to receive user inputs. Device 400 can be any type of computing device, such as, a smart phone, a personal digital assistant (PDA), a cellular telephone, a tablet, a laptop computer, a desktop computer, a node in a network, user equipment or a display device.

According to embodiments of the invention, an authentication module can be used to authenticate users. The authentication module can be a module included in device 400, or a module apart from device 400. For example, the authentication module can be an authentication application or service installed on device 400, or a device outside of device 400. In a further example, the authentication module may include a plurality of components, wherein at least one component of the authentication module can be run on device 400 and at least one component of the authentication module can be run on another device.

The authentication module can authenticate a user in response to receiving an authentication request from the user. For example, a user may want to access an application installed on device 400. The authentication module can authenticate the user in response to receiving an initiation action from the user. For example, the initiation action can be a selection action to an application or service to be accessed.

According to embodiments of the invention, during an authentication process, the user to be authenticated can input identity information, for example "user ID X", using device 400. For the purposes of description, the user to be authenticated will be referred as user X in the following of the disclosure.

In response to receiving the identity information "user ID X", the authentication module can obtain multiple questions. One or more of the of questions can be randomly selected from a set of questions generated in response to a password being established in association with the identity information "user ID X". In another example, one or more of the questions can be dynamically generated in response to the identity information "user ID X" being received in the authentication process.

The password related to identity information "user ID X" can be analyzed, and then one or more questions can be generated based on the analysis. In an example, if the password is saved as cipher texts, the cipher texts can be transformed to plain texts before or during the authentication. One or more attributes of the password can be determined after the analysis. The attributes of the password may include at least one of the following: positions of characters comprised in the password, categories of the characters, values of the characters or meaning of the characters. It is to be understood that the invention is not limited to above mentioned attributes, and any other suitable attribute can also be applied and determined.

Figure 5:
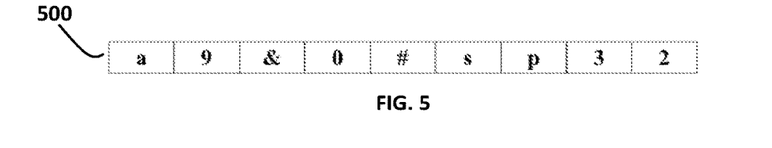
FIG. 5 depicts an example password according to an embodiment of the present invention.

Referencing now to FIG. 5, an example password 500 is illustrated. The password 500 may include one or more digits, letters or symbols, such as 9 characters "a9&0#sp32". For each character, one or more attributes may be determined. In an example, three attributes including "position", "category" and "value" are determined, and the attributes "position", "category" and "value" of the character "a" in the password "a9&0#sp32" can be "1", "letter", and "a". It is to be understood that other attributes can also be determined.

Figure 6:
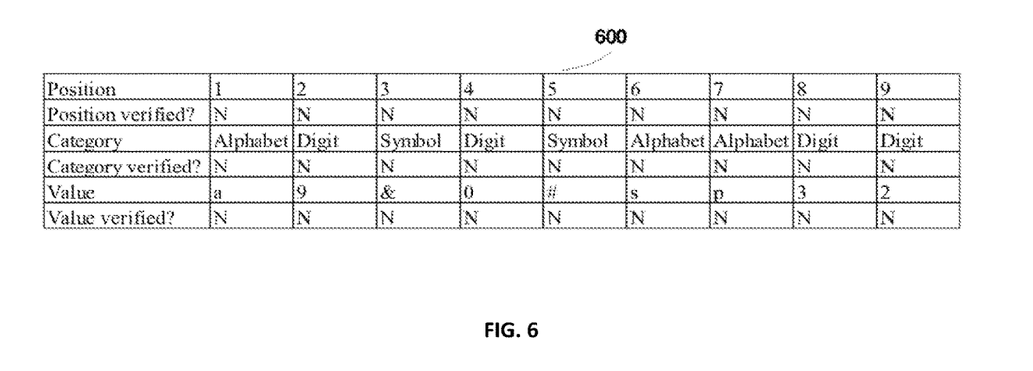
FIG. 6 depicts an example attribute table according to an embodiment of the present invention.

Referencing now to FIG. 6, an example attribute table 600 can be established and then saved. In the attribute table 600, three attributes, including "position", "category" and "value", are determined for the password 500. Selection statuses of the attributes may also be recorded. As all these attributes have not been selected to generate questions yet, the selection statuses of the attributes are marked as "N". In this example, an attribute has been selected to generate questions may mean that a question has been generated based on this attribute. An attribute that has not been verified may mean that no question has been generated based on this attribute.

According to embodiments of the invention, one or more characters in the password may be verified in an authentication question. The one or more character to be verified may be selected by the authentication module. The selection can be done randomly or following a specific rule. For example, characters of a same category can be selected and verified in the question. One or more attributes of the one or more characters to be verified can be selected to generate questions. The selection of attributes of the one or more characters to be verified may be selected randomly or may be selected following a specific order. For example, the same attributes of the characters to be verified may be selected.

In an example, characters with attributes already selected in a previous question generation can be excluded from the selection. For example, the selection can be implemented using the attribute table 600, and only characters with at least one attribute marked with "N" can be selected, and the at least one attribute marked with "N" can be used to generate a question. In a further example, characters with attributes that have all been selected can also be selected.

According to embodiments of the invention, at least one authentication question can be generated based on one or more attributes of the characters to be verified. The question can be generated according to one or more rules. The one or more rules can be set previously by the user or a service provider. Cognitive technologies and systems can be used to generate the question. It shall be understood that many existing or future developed methods can be applied to generate the question based on the attributes of the characters to be verified.

According to embodiments of the invention, the question can be generated according to one or more rules corresponding to the categories of the characters to be verified. For example, if one or more "digit" characters in the password are to be verified, the question can be generated based on positions, values or other mathematical properties of the one or more "digit" characters. The mathematical properties may include, for example, parity (odd or even) or mathematical operation properties.

As an example, if one or more "letter" characters in the password are to be verified, the question can be generated based on positions (e.g., upper or lower case), meanings of continuous or discontinuous characters or other properties. If one or more "symbol" characters in the password are to be verified, the question can be generated based on positions, shape features, or other properties.

According to embodiments of the invention, the question can be generated directly based on the attributes to be verified. In an example, the character "a" in the password "a9&0#sp32" and attributes "position" and "value" have been selected, the generated question may include "Is the first character capitalized?" or "What is the value of first character?".

As an example, if character "9" in the password "a9&0#sp32" and attributes "position" and "category" of character "9" have been selected, the generated question may include "Is the second character a letter?" or "What is the category of the second character?".

According to embodiments of the invention, the questions can be generated based on at least two characters to be verified. As an example, if characters "9" and "0" in the password "a9&0#sp32" and attributes "position" and "value" have been selected, the generated question can be "Is the second character larger than the forth character?", or "What is the result if the first character is added by the forth character?"

Once the question has been obtained, one or more correct answers can also be determined for the obtained question. The correct answers can also be saved for future user authentication. See below example questions and correct answers.

| Question | Correct Answer |
| --- | --- |
| Is the first character capitalized? | No |
| What is the value of first character? | a |
| Is the second character a letter? | No |
| What is the category of the second character? | Digit |
| Is the second character larger than the forth character? | Yes |
| What is the result if the first character is added by the forth character? | 9 |

According to embodiments of the invention, the obtained plurality of questions may also include one or more pseudo questions generated according to a pseudo password. For example, a pseudo password can be randomly generated, and the pseudo password can include multiple random characters. Attributes of the pseudo password can be determined, and then pseudo questions can be generated according to the attributes of the pseudo password using the above-mentioned methods. One or more of the pseudo questions can be generated in response to the password being established in association with the identity information. In another example, one or more of the pseudo questions can be dynamically generated in response to the identity information being received in an authentication process.

The obtained plurality of questions can be determined or divided to be one or more valid questions and one or more invalid questions according to an authentication rule predefined by the user. The valid questions may include questions generated based on the attributes of the password corresponding to "user ID X". The invalid questions may also include questions generated based on the attributes of the password corresponding to "user ID X" and may additionally include questions generated based on attributes of a pseudo password.

A user can also set an authentication rule when the user sets an identity information and a password. The authentication rule can also define how many rounds of questions will be presented in an authentication process and which question in each round of questions is a valid question or an invalid question. It shall be understood that many other rules can also be applied in the embodiments of the invention, and embodiments of the invention are not limited to the above-mentioned example rules. The rounds of questions and which question in each round is a valid question or an invalid question can be freely set by the user. A round of questions can also be referred as a group of questions and each round of questions can be presented to user X at a same page or with a same identifier. For example, each round of questions can be presented with a round serial number and the round serial number can be used by user X to distinguish whether the questions belong to a same round.

For example, an authentication rule can be "an authentication process comprises one round of questions, the first and third questions are valid questions in the round of questions". As another example, an authentication rule can be "an authentication process comprises two rounds of questions, the second question is a valid question in a first round of questions; the first question is a valid question in a second round of question".

As a further example, if the authentication rule is "an authentication process comprises one round of questions, the first and third questions are valid questions in the round of questions", valid questions may include the first question and the third question presented to user X, and invalid questions may include other questions presented to user X. As a further example, if the authentication rule is "an authentication process comprises one round of questions, the second question is an invalid question in the round of questions", the invalid question may include the second question presented to user X and the valid questions may include the other questions presented to user X.

According to embodiments of the invention, the authentication rule can also be configured based on the attributes of the password corresponding to "user ID X". For example, the user can set an authentication rule "question generated based on mathematical operation properties of "digit" characters are valid questions", so question "What is the result if the first character is added by the forth character?" can be regarded as a valid question.

Figure 7:
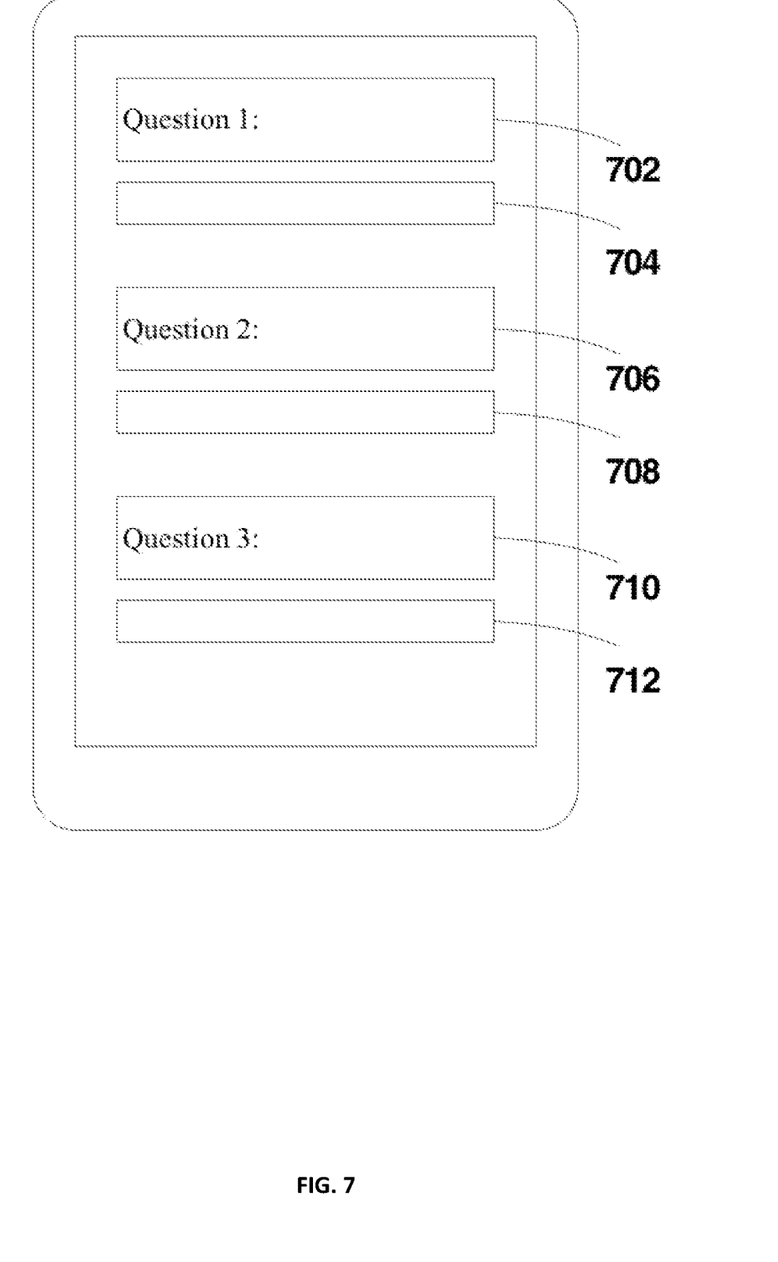
FIG. 7 depicts an example device according to an embodiment of the present invention.

Referencing now to FIG. 7, an example device is illustrated according to an embodiment of the present invention. A multiple questions, such as questions 702, 706 and 710, can be obtained and then presented to user X on the device 400. As an example, questions 702, 706 and 710 can respectively be "Is the first character capitalized?", "Is the second character a letter?", and "Is the second character larger than the forth character?".

Each of questions 702, 706 and 710 can be determined to be a valid question or an invalid question. For example, if the authentication rule is "an authentication process comprises one round of questions, the first and third questions are valid questions in the round of questions", questions 702 and 710 can be regarded as valid questions, and question 706 can be regarded as an invalid question. Question 702 is displayed as a first question to user X, question 706 is displayed as a second question to user X, and question 710 is displayed as a third question to user X. It shall be understood that questions 702, 706 and 710 can also be displayed on different pages or with same identifiers showing they are included in a same round of questions.

Each of questions 702, 706 and 710 can be assigned with a sequence number. The sequence numbers assigned to questions 702, 706 and 710 can be determined according to the display sequence of each question. For example, questions 702, 706 and 710 can be assigned with 1, 2, and 3 respectively. Questions 702, 706 and 710 are displayed to user X according to the assigned sequence numbers.

User X can read questions 702, 706 and 710 using the device 400, and then input contents 704, 708 and 712 for questions 702, 706 and 710. Contents 704, 708 and 712 can be received by device 400 and displayed on device 400. In some embodiments, user X can only input or select contents for one or more of questions 702, 706 and 710. The contents for the one or more of questions 702, 706 and 710 can be answers of user X to the one or more questions 702, 706 and 710. According to embodiments of the invention, "the input from user X corresponds to one or more of questions 702, 706 and 710" may mean that the input from user X includes contents for the one or more of questions 702, 706 and 710.

According to embodiments of the invention, options can also be shown on device 400 and provided to user X. User X can select and input one or more options and the selection can be detected by the device 400. For example, for question 702 "Is the first character capitalized?", two options including "Yes" and "No" can be also shown on device 400. User X can touch or click on an area on the device 400 corresponding to an option in order to input an option, such as "Yes", and the device 400 can receive the input.

According to embodiments of the invention, the authentication module can obtain the input from user X and then authenticate user X based on the input. In response to the input corresponding to one or more valid questions, the user can be authenticated based on the input and the one or more valid questions. If the input corresponds to one or more invalid questions, then the user will be authenticated to be an invalid user. In a further example, if the input matches with at least one answer of the one or more valid questions, the user will be authenticated to be a valid user. If the input does not match with at least one answer of the one or more valid questions, then the user will be authenticated to be an invalid user.

For example, the input received from user X may include content (i.e., an answer) for question 702 "Is the first character capitalized?", and the content for question 702 can be "Yes" or "No". As question 702 is a valid question, the authentication module can further compare the input with the correct answer of question 702. As the correct answer of question 702 is "No" based on the password, if user X inputs "No", the input from user X will matches with the correct answer; and if user X inputs "Yes", the input will not match with the correct answer. In response to the input matching with the correct answer, the user can be authenticated to be a valid user.

As a further example, user X may be required to answer all valid questions. If questions 702 and 710 are valid questions, then the input from user X may include content for questions 702 and 710 and user X can be authenticated based on the input. If contents included in the input match with all the correct answers of questions 702 and 710, then user X will be authenticated to be a valid user.

As a further example, if the input from user X include content for question 706 and question 706 is an invalid question, then user X will be authenticated to be an invalid user without the need to further comparing the input with the correct answer of question 706.

According to embodiments of the invention, if the input from user X matches with a correct answer of a valid question or all correct answers of valid questions, a count of rounds of questions already presented to the user will be compared with a number of rounds set by the authentication rule. If the count of rounds of questions already presented to the user is smaller than the number of rounds, a further round of further questions can be presented to user X. The further questions can be different to questions 702, 706 and 710, and also include one or more valid questions or one or more invalid questions. User X can continue to input answers or selections to this further round of questions. If the further input corresponds to one or more of the further valid questions, the user can be authenticated based on the further input. The processes responsive to receiving further input can be similar to the above-mentioned processes. The count of rounds of questions can be added with 1 after the questions are presented to user X.

According to embodiments of the invention, the obtained questions can be different for each time of authentication. For example, when user X requests to log in two different times, questions obtained at a time can be different from questions obtained at a different time. This can be approached by selecting different characters and attributes to be verified using a different question generation rule to generate the question or by selecting different questions from a set of generated questions.

Figure 8:
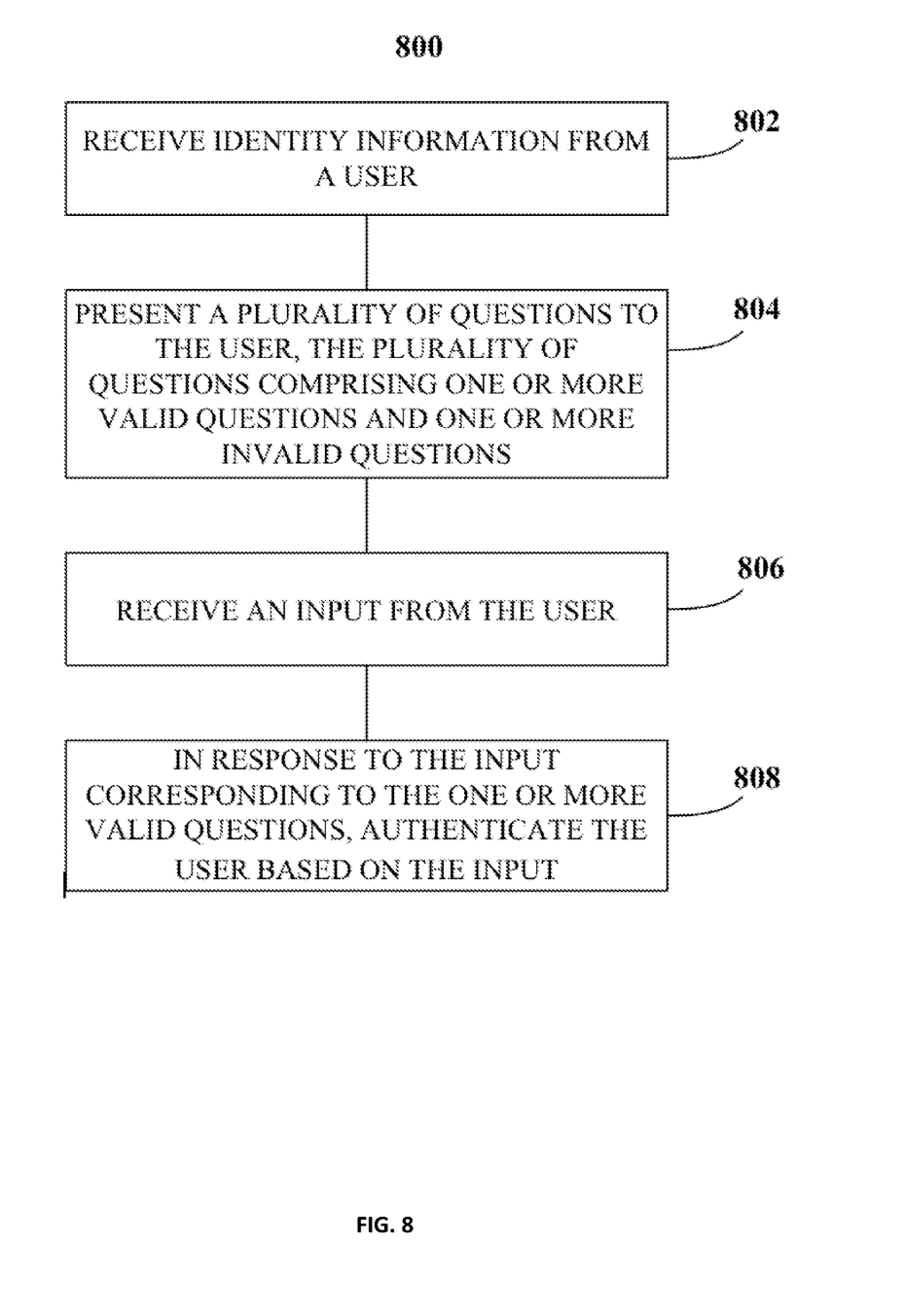
FIG. 8 depicts a flowchart of an example method for user authentication according to an embodiment of the present invention.

According to embodiments of the invention, there is provided a computer-implemented method for user authentication without inputting passwords. With reference now to FIG. 8, a flowchart of an example method 800 for user authentication according to an embodiment of the present invention is illustrated.

It shall be understood that methods for user authentication provided by embodiments of the invention can be implemented by many different device types, such as, by device 400, another device outside of device 400, a remote device, or a sever. In some embodiments, the methods may include multiple steps, when some steps of the methods can be run on device 400 and other steps of the methods can be run on another device. In some embodiments, all or some steps of the methods can also be implemented by computer system/server 12.

In block 802, identity information can be received from a user. In block 804, multiple questions can be presented to the user and may include one or more valid questions and one or more invalid questions. The one or more valid questions can be generated based on a password related to the identity information. The one or more invalid questions can be generated based on the password or a pseudo password. In block 806, an input can be received from the user. In block 808, in response to the input corresponding to the one or more valid questions, the user can be authenticated based on the input and the one or more valid questions.

According to embodiments of the invention, there is provided a computer system for user authentication. The computer system comprises a processor, a computer-readable memory coupled to the processor. The computer-readable memory comprises instructions that when executed by the processor perform actions of: receiving identity information from a user; presenting a plurality of questions to the user, the plurality of questions comprising one or more valid questions generated based on a password related to the identity information and one or more invalid questions; receiving an input from the user; and in response to the input corresponding to the one or more valid questions, authenticating the user based on the input.

According to embodiments of the invention, there is provided a computer program product for user authentication. The computer program product comprises a computer readable storage medium having program instructions embodied therewith, the program instructions executable by a processor to cause the processor perform actions of: receiving identity information from a user; presenting a plurality of questions to the user, the plurality of questions comprising one or more valid questions generated based on a password related to the identity information and one or more invalid questions; receiving an input from the user; and in response to the input corresponding to the one or more valid questions, authenticating the user based on the input.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving identity information from a user;
presenting a plurality of questions to the user, wherein the plurality of questions includes one or more valid questions generated based on a password related to the identity information and one or more invalid questions, wherein the one or more valid questions are generated according to one or more attributes of the password, wherein one of the one or more attributes includes positions of characters in the password, wherein one or more of the plurality of questions are generated based on selecting different characters of the password to be verified;
receiving an input from the user, wherein the input does not include the password; and
in response to the input corresponding to the one or more valid questions, authenticating the user based on the input.

2. The computer-implemented method of claim 1, wherein the authenticating the user based on the input further comprising:
in response to the input matching with at least one answer of the one or more valid questions, authenticating the user to be a valid user; and
in response to the input not matching with at least one answer of the one or more valid questions, authenticating the user to be an invalid user.

3. The computer-implemented method of claim 1, further comprising:
in response to the input corresponding to the one or more invalid questions, authenticating the user to be an invalid user.

4. The computer-implemented method of claim 1, wherein each of the plurality of questions is determined to be a valid question or an invalid question according to a preset authentication rule.

5. The computer-implemented method of claim 4, wherein the authentication rule further defines the number of rounds of questions to be presented to the user.

6. The computer-implemented method of claim 5, wherein authenticating the user based on the input further comprising:
in response to the input matching with at least one answer of the one or more valid questions, determining whether a count of rounds of questions already presented to the user is smaller than the number of rounds;
in response to the count of rounds smaller than the number of rounds, presenting a further plurality of questions to the user, wherein the further plurality of questions includes one or more further valid questions and one or more further invalid questions;
receiving a further input from the user; and
in response to the further input corresponding to the one or more further valid questions, authenticating the user based on the further input.

7. The computer-implemented method of claim 1, wherein the one or more attributes of the password include the positions of characters in the password, categories of the characters, values of the characters and meaning of the characters.

8. The computer-implemented method of claim 1, wherein the one or more invalid questions are generated according to the one or more attributes of the password or one or more attributes of a pseudo password.

9. The computer-implemented method of claim 1, wherein one or more of the plurality of questions are randomly selected from a set of questions generated in response to the password being established in association with the identity information, and wherein one or more of the plurality of questions are dynamically generated in response to the identity information being received.

10. A computer system comprising:
a processor;
a computer-readable memory coupled to the processor, the computer-readable memory comprising instructions that when executed by the processor perform actions of:
receiving identity information from a user;
presenting a plurality of questions to the user, wherein the plurality of questions includes one or more valid questions generated based on a password related to the identity information and one or more invalid questions, wherein the one or more valid questions are generated according to one or more attributes of the password, wherein one of the one or more attributes includes positions of characters in the password, wherein one or more of the plurality of questions are generated based on selecting different characters of the password to be verified;
receiving an input from the user, wherein the input does not include the password; and
in response to the input corresponding to the one or more valid questions, authenticating the user based on the input.

11. The computer system of claim 10, wherein the authenticating the user based on the input further comprising:
in response to the input matching with at least one answer of the one or more valid questions, authenticating the user to be a valid user; and
in response to the input not matching with at least one answer of the one or more valid questions, authenticating the user to be an invalid user.

12. The computer system of claim 10, the actions further comprising:
in response to the input corresponding to the one or more invalid questions, authenticating the user to be an invalid user.

13. The computer system of claim 10, wherein each of the plurality of questions is determined to be a valid question or an invalid question according to a preset authentication rule.

14. The computer system of claim 13, wherein the authentication rule further defines the number of rounds of questions to be presented to the user.

15. A computer program product, comprising a computer readable storage medium having program instructions embodied therewith, the program instructions executable by a processor to cause the processor to perform actions of:
receiving identity information from a user;
presenting a plurality of questions to the user, wherein the plurality of questions includes one or more valid questions generated based on a password related to the identity information and one or more invalid questions, wherein the one or more valid questions are generated according to one or more attributes of the password, wherein one of the one or more attributes includes positions of characters in the password, wherein one or more of the plurality of questions are generated based on selecting different characters of the password to be verified;

receiving an input from the user, wherein the input does not include the password; and in response to the input corresponding to the one or more valid questions, authenticating the user based on the input.

16. The computer program product of claim 15, wherein the authenticating the user based on the input further comprising:

in response to the input matching with at least one answer of the one or more valid questions, authenticating the user to be a valid user; and in response to the input not matching with at least one answer of the one or more valid questions, authenticating the user to be an invalid user.

17. The computer program product of claim 15, the actions further comprising:

in response to the input corresponding to the one or more invalid questions, authenticating the user to be an invalid user.

18. The computer program product of claim 15, wherein each of the plurality of questions is determined to be a valid question or an invalid question according to a preset authentication rule.

19. The computer program product of claim 18, wherein the authentication rule further defines the number of rounds of questions to be presented to the user.

* * * * *